United States Patent
Hung

(10) Patent No.: US 9,207,752 B2
(45) Date of Patent: Dec. 8, 2015

(54) COMPUTER DEVICE AND METHOD OF POWER MANAGEMENT OF THE SAME

(71) Applicant: Quanta Computer Inc., Taoyuan Shien (TW)

(72) Inventor: Li-Te Hung, Taipei (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 270 days.

(21) Appl. No.: 13/952,715

(22) Filed: Jul. 29, 2013

(65) Prior Publication Data

US 2014/0189406 A1    Jul. 3, 2014

(30) Foreign Application Priority Data

Jan. 3, 2013   (TW) .............................. 102100143 A

(51) Int. Cl.
*G06F 1/32* (2006.01)
*G06F 1/16* (2006.01)
*H04W 4/00* (2009.01)

(52) U.S. Cl.
CPC ............ *G06F 1/3287* (2013.01); *G06F 1/1698* (2013.01); *H04W 4/008* (2013.01)

(58) Field of Classification Search
CPC .............................. G06F 1/1698; G06F 1/3287
USPC ......................................................... 713/323
See application file for complete search history.

(56) References Cited

U.S. PATENT DOCUMENTS

| | | | |
|---|---|---|---|
| 8,880,055 B1* | 11/2014 | Clement et al. ................ | 455/420 |
| 2002/0085008 A1* | 7/2002 | Jain et al. ....................... | 345/520 |
| 2007/0186023 A1* | 8/2007 | Ho ................................. | 710/266 |
| 2007/0285428 A1* | 12/2007 | Foster et al. ................... | 345/503 |
| 2010/0178866 A1 | 7/2010 | Jalkanen | |
| 2011/0184998 A1* | 7/2011 | Palahnuk et al. .............. | 707/827 |
| 2012/0135680 A1* | 5/2012 | Deluca .......................... | 455/41.1 |
| 2012/0242671 A1* | 9/2012 | Wyatt ............................. | 345/520 |
| 2012/0303990 A1* | 11/2012 | Nanda et al. ................... | 713/324 |
| 2013/0332756 A1* | 12/2013 | Kim et al. ...................... | 713/320 |
| 2014/0120990 A1* | 5/2014 | Parco et al. .................... | 455/574 |
| 2014/0181535 A1* | 6/2014 | Smith et al. ................... | 713/300 |

FOREIGN PATENT DOCUMENTS

| | | |
|---|---|---|
| TW | 200923637 A | 6/2009 |
| TW | 201135441 A | 10/2011 |
| TW | 201214101 A | 4/2012 |
| TW | M443224 U | 12/2012 |

* cited by examiner

*Primary Examiner* — Vincent Tran
(74) *Attorney, Agent, or Firm* — Rabin & Berdo, P.C.

(57) ABSTRACT

A method of power management of a computer device includes a number of steps. When a decision element determines that the computer device must enter a power saving mode, the decision element generates a power saving mode signal. When an embedded controller detects the power saving mode signal, the embedded controller determines whether an NFC transceiving module is sending or receiving information. If the NFC transceiving module is sending or receiving information, the embedded controller postpones entering into the power saving mode by the computer device until the NFC transceiving module finishes sending or receiving information.

5 Claims, 5 Drawing Sheets

COMPUTER DEVICE AND METHOD OF POWER MANAGEMENT OF THE SAME

RELATED APPLICATIONS

This application claims priority to Taiwan Application Serial Number 102100143, filed Jan. 3, 2013, which is herein incorporated by reference.

BACKGROUND

1. Technical Field

The disclosure relates to a computer device and a method of power management of the same. More particularly, the disclosure relates to a computer device with near field communication (NFC) capability and a method of power management of the computer device.

2. Description of Related Art

It is becoming increasingly common for portable electronic apparatuses to have a built-in near field communication (NFC) chip. The functionality provided by the NFC chip for contactless point-to-point communication between the portable electronic apparatus and an external device allows for convenient connections and quick and easy communication.

In order to save power, a display sleep program for the display screen is typically installed in the portable electronic apparatus. However, if a user uses the near field communication (NFC) capability of transmitting or receiving information (e.g., financial transaction information or personal information) to or from an external device when the display sleep program of the portable electronic apparatus is being activated, the display screen will not show any information, making the user anxious and unsure whether the information has been successfully transmitted or received. This may lead to loss of personal information or financial loss to the user.

SUMMARY

The disclosure provides a computer device and a method of power management of the same for solving the aforementioned inconveniences and problems, in which the computer device and method allow for continued use of the original saving power mode of the computer device, while avoiding the inconvenience and worry associated with using the near field communication (NFC) capability of the computer device to transmit and receive information when the saving power mode of the computer device is being activated.

In one aspect of the disclosure, the method of power management of the computer device is provided. The method comprises steps (A) to (D). In Step (A), when a decision unit of the computer device determines that the computer device is required to enter a power saving mode, the decision unit generates a power-saving-mode signal for instructing the computer device to enter the power saving mode. In Step (B), when an embedded controller of the computer device receives the power-saving-mode signal, the embedded controller starts to determine whether a NFC transceiving module of the computer device is performing information communication. In Step (C), when the embedded controller determines that the NFC transceiving module is performing information communication, the embedded controller postpones entering into the power saving mode until the NFC transceiving module finishes performing information communication. Finally, in Step (D), when the embedded controller determines that the NFC transceiving module is not performing information communication, the embedded controller shuts down electric power of a display module of the computer device based on the power-saving-mode signal.

In another aspect of the disclosure, the computer device comprises a decision unit, a near field communication (NFC) transceiving module, a display module and an embedded controller. The decision unit determines whether the computer device is required to enter a power saving mode right now. The NFC transceiving module performs information communication with an external NFC unit. The display module comprises a backlight module and a display panel. The embedded controller electrically connects to the decision unit, the NFC transceiving module and the display module.

When the decision unit determines that the computer device is required to enter a power saving mode right now, the decision unit generates a power-saving-mode signal for enabling the computer device to enter the power saving mode. When the embedded controller detects the power-saving-mode signal, the embedded controller determines whether the NFC transceiving module is performing information communication. When the embedded controller determines that the NFC transceiving module is performing information communication, the embedded controller postpones the entering into the power saving mode until the NFC transceiving module finishes performing information communication.

Through use of the computer device and the method of power management of the same of the disclosure, users will not be anxious and confused when the display screen shows no information when the near field communication (NFC) capability of the computer device is being used to perform information communication, thereby removing the concern related to the loss of personal information or related to financial loss of the user.

BRIEF DESCRIPTION OF THE DRAWINGS

In order to make the foregoing as well as other aspects, features, advantages, and embodiments of the disclosure more apparent, the accompanying drawings are described as follows.

DETAILED DESCRIPTION

The spirit of the disclosure will be described clearly through the drawings and the detailed description as follows. Any person of ordinary skill in the art can make modifications and variations from the technology taught in the disclosure after understanding the embodiments of the disclosure, without departing from the sprite and scope of the disclosure.

Figure 1:
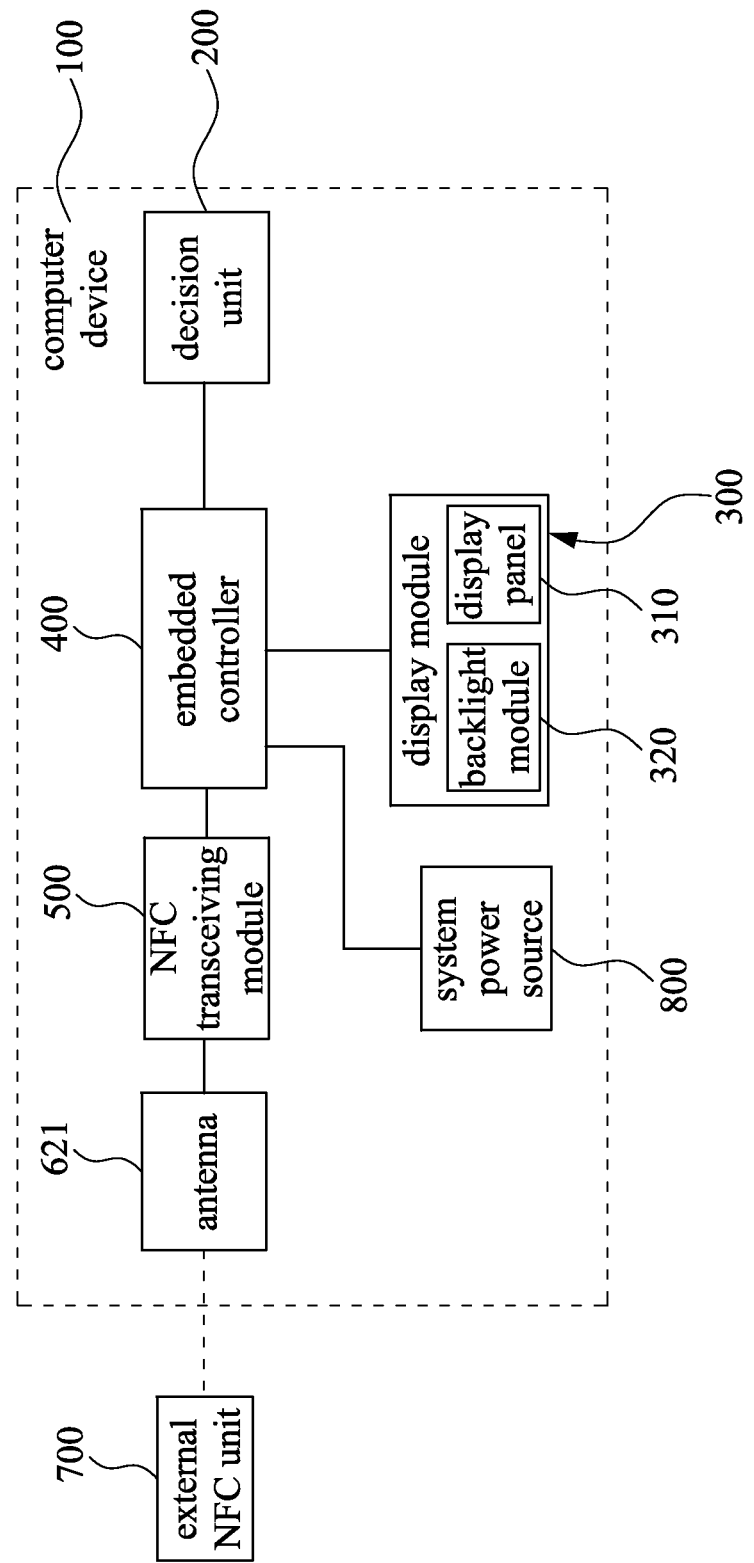
FIG. 1 is a block diagram showing a computer device according to one embodiment of the present invention.

FIG. 1 is a block diagram showing a computer device 100 according to one embodiment of the present invention. The computer device 100 includes a system power source 800, a decision unit 200, a near field communication transceiver (NFC transceiving module hereinafter) 500, a display module 300 and an embedded controller (EC) 400. The embedded controller 400 electrically connects to the decision unit 200, the NFC transceiving module 500 and the display module 300.

The decision unit 200 performs continuous detection to determine whether the computer device 100 satisfies a condition for entering a power saving mode (e.g., a screen power saving mode or sleep mode), that is, to determine whether the computer device 100 is required to or must enter the power saving mode. Specifically, the condition can be when, for example, the computer device 100 or the display module 300 has not been operated for a predetermined period of time, or when electric power (e.g., battery power) of the computer device 100 has reached lower threshold for operation.

An antenna 621 is electrically connected to the NFC transceiving module 500. In some embodiments, the antenna 621 is a part of the NFC transceiving module 500. The NFC transceiving module 500 performs information communication (i.e., information transmission or reception) with an external NFC unit 700 through the antenna 621.

The external NFC unit 700 can be a portable item, for example, a credit card, a contact-less access card or a key. The display module 300 includes a display panel 310 and a backlight module 320. Both of the display panel 310 and the backlight module 320 are electrically connected to the embedded controller 400. The embedded controller 400 is electrically connected to the system power source 800, and is responsible for distributing electric power supplied from the system power source 800 to all elements of the computer device 100 including the embedded controller 400, the display panel 310 and the backlight module 320. The embedded controller 400 determines whether the NFC transceiving module 500 is performing information communication (i.e., transmission or reception of information) by detecting whether a pin of the NFC transceiving module 500 is at a high or low level.

Figure 2:
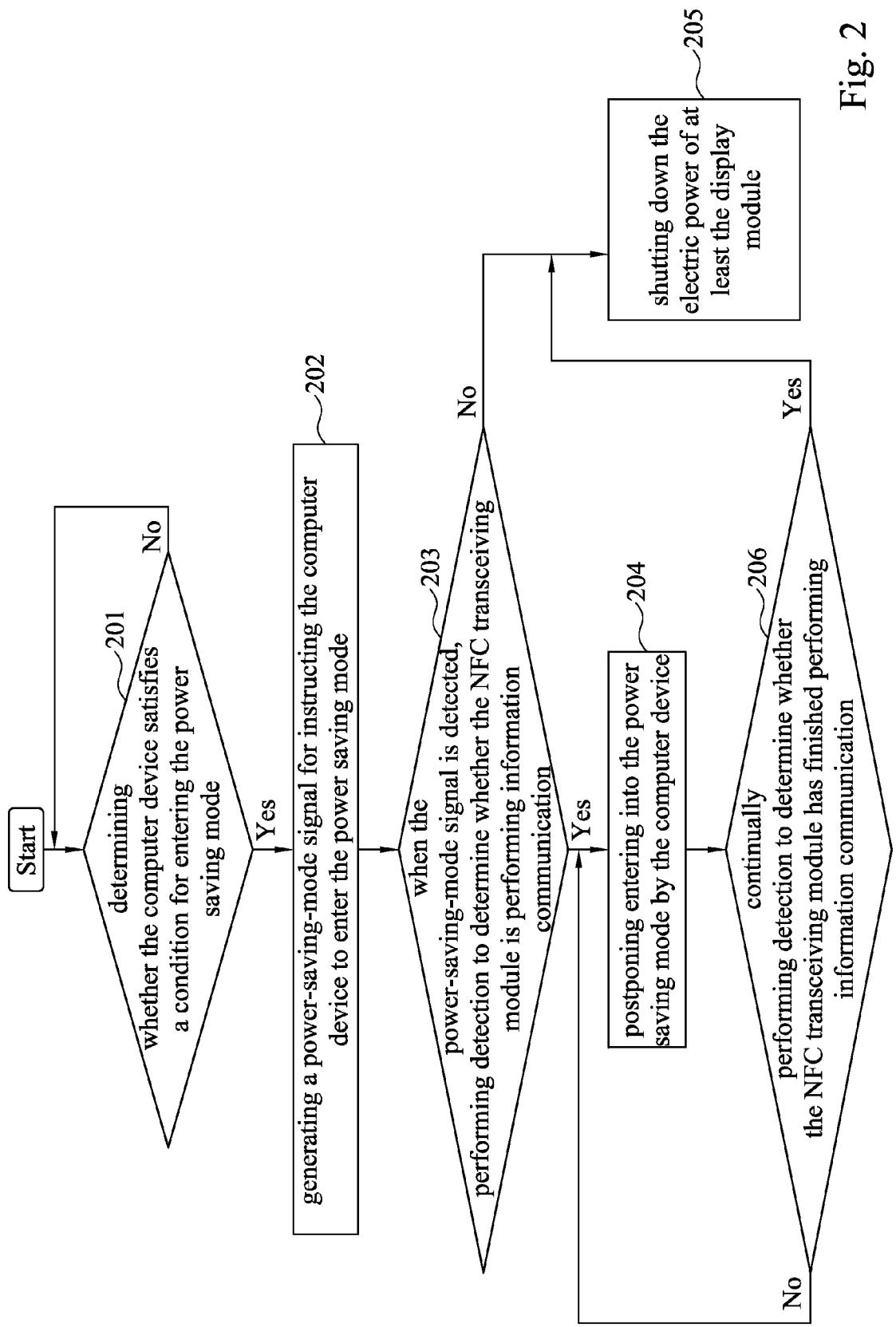
FIG. 2 is a flow chart showing a method of power management according to one embodiment of the present invention.

FIG. 2 is a flow chart showing a method of power management according to an embodiment of the present invention.

Referring to FIG. 1 and FIG. 2, the method of power management of the computer device 100 includes steps (201) to (206) as outlined below.

In Step (201), the decision unit 200 determines whether the computer device 100 satisfies the condition for entering the power saving mode. If the computer device 100 satisfies the condition for entering the power saving mode, indicating that the computer device 100 is required to or must enter the power saving mode, then the routine goes to Step (202), otherwise, the routine returns back to Step (201) for another determination. In Step (202), the decision unit 200 generates a power-saving-mode signal for instructing the computer device 100 to enter the power saving mode. In Step (203), when the embedded controller 400 detects the power-saving-mode signal, the embedded controller 400 performs detection to determine whether the NFC transceiving module 500 is performing information communication. If the NFC transceiving module 500 is performing information communication, this indicates that the NFC transceiving module 500 is transmitting and/or receiving information to or from an external source, the routine goes to Step (204), otherwise, the routine goes to Step (205). In Step (204), the embedded controller 400 postpones the computer device 100 entering the power saving mode, and then the routine goes to Step (206). In Step (205), the embedded controller 400 shuts down the electric power of at least the display module 300. In Step (206), after the embedded controller 400 postpones entering into the power saving mode, the embedded controller 400 continually performs detection to determine whether the NFC transceiving module 500 has finished performing information communication. If the NFC transceiving module 500 has finished performing information communication, the routine goes to Step (205), otherwise, the routine returns to Step (204) for continued postponement of entering into the power saving mode.

In one specific embodiment, shutting down the electric power of the display module 300 entails shutting down the electric power of the display panel 310, the electric power of the backlight module 320, or the electric power of both of the display panel 310 and the backlight module 320.

Figure 3:
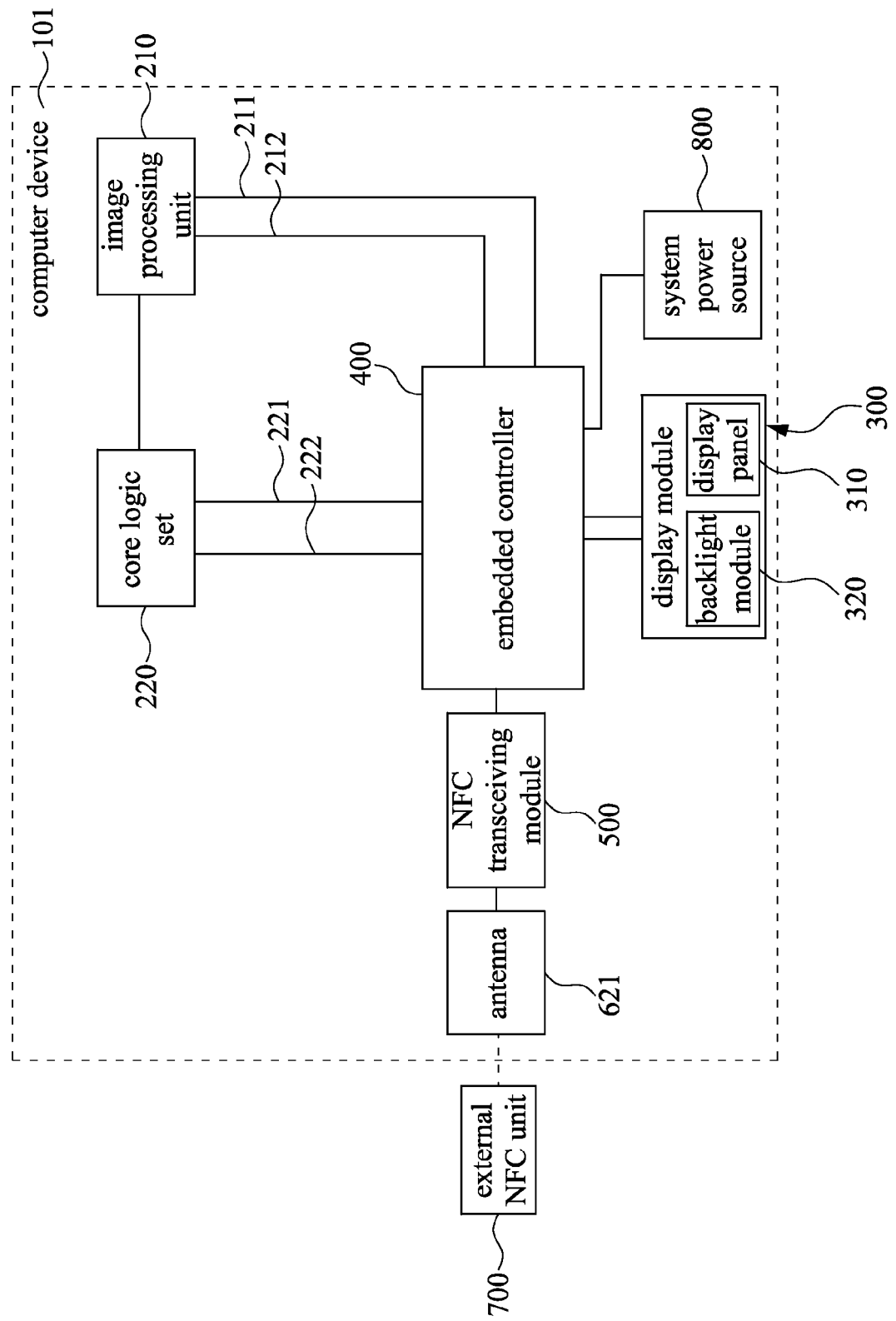
FIG. 3 is a block diagram showing the computer device according to another embodiment of the present invention.

FIG. 3 is a block diagram showing the computer device 101 according to another embodiment of the present invention.

The computer device 101 includes an image processing unit 210 or Graphic Processor Unit (GPU) and a core logic set 220 electrically connected to the image processing unit 210. The image processing unit 210 can be an independent element installed external to the core logic set 220. However, the disclosure is not limited to this specific embodiment. For example, the image processing unit 210 also can be installed inside the core logic set 220 (not shown). The core logic set 220 includes a sleep pin 221 and a shutdown pin 222. The image processing unit 210 includes a backlight module power pin 211 and a display panel power pin 212.

Figure 4:
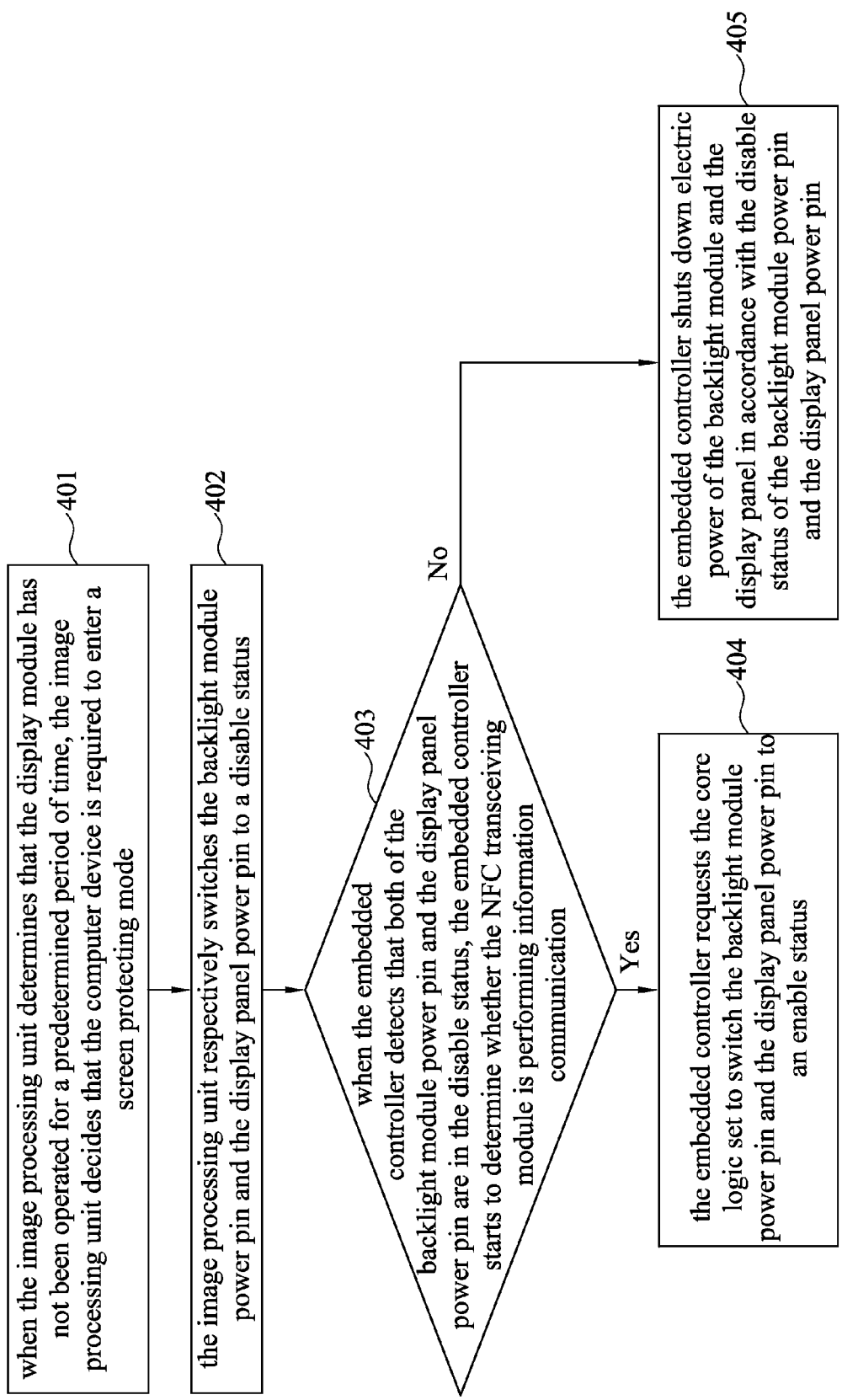
FIG. 4 is a flow chart showing a method of power management according to another embodiment of the present invention.

FIG. 4 is a flow chart showing a method of power management according to another embodiment of the present invention.

Referring to FIGS. 3 and 4, in this embodiment, when the decision unit 200, for example, is an image processing unit 210, the aforementioned Step (201) to Step (205) further include detailed steps (401) to (405) as follows.

In Step (401), when the image processing unit 210 determines that the display module 300 has not been operated for a predetermined period of time, the image processing unit 210 further determines that the computer device 101 is required to or must enter a screen power saving mode. In Step (402), the image processing unit 210 switches the backlight module power pin 211 and the display panel power pin 212 to a disable status. In Step (403), when the embedded controller 400 detects that both of the backlight module power pin 211 and the display panel power pin 212 are in the disable status, the embedded controller 400 starts to determine whether the NFC transceiving module 500 is performing information communication by detecting whether a pin level(s) of the NFC transceiving module 500 is high or low. If the NFC transceiving module 500 is performing information communication, the routine goes to Step (404), otherwise, the routine goes to Step (405). In Step (404), the embedded controller 400 requests the core logic set 220 to switch the backlight module power pin 211 and the display panel power pin 212 to an enable status from the disable status, and then the core logic set 220 passes the information to the image processing unit 210. In Step (405), the embedded controller 400 shuts down electric power of the backlight module 320 and the display panel 310 in accordance with the disable status of the backlight module power pin 211 and the display panel power pin 212.

Figure 5:
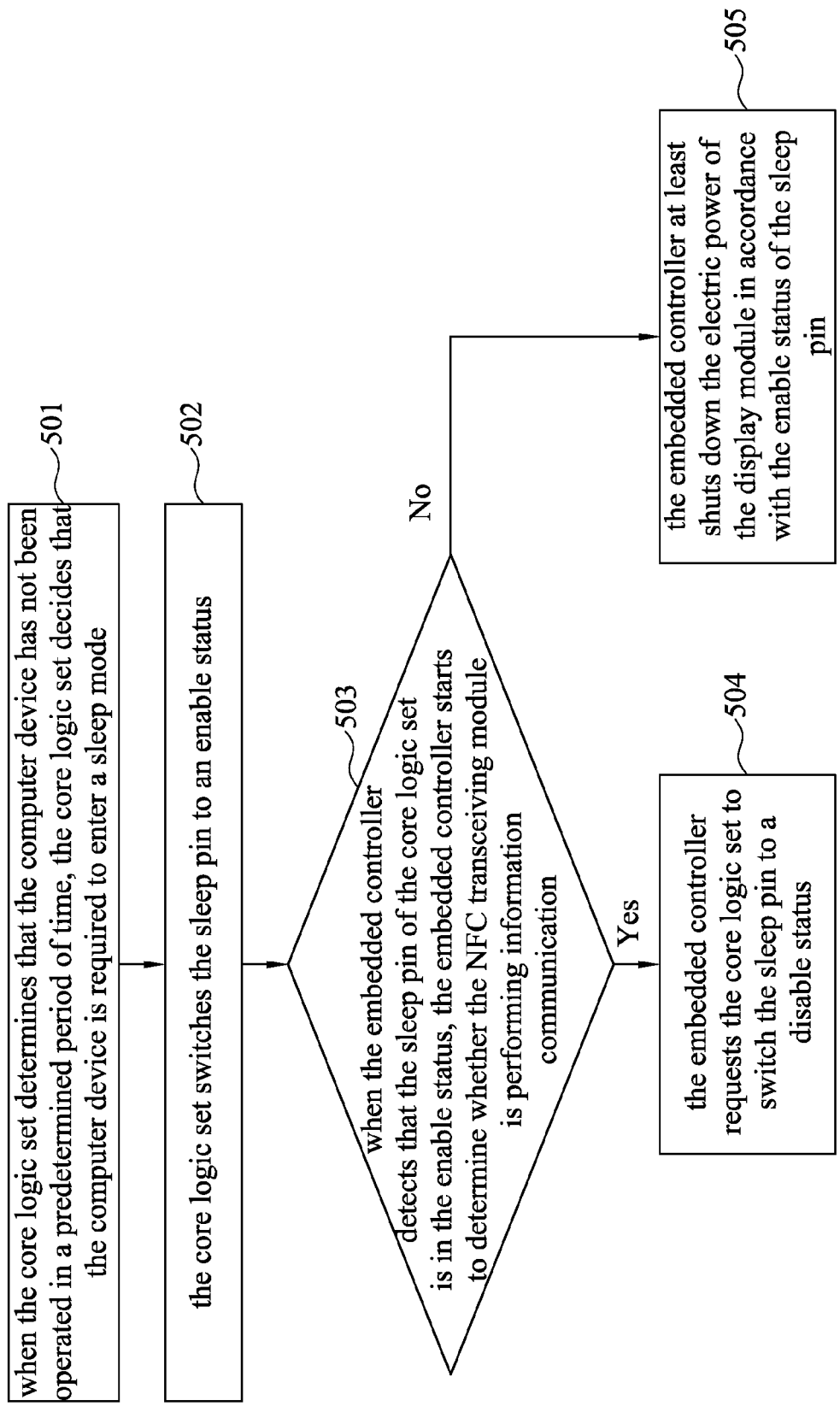
FIG. 5 is a flow chart showing a method of power management according to yet another embodiment of the present invention.

FIG. 5 is a flow chart showing a method of power management according to yet another embodiment of the present invention.

Referring to FIGS. 3 and 5, in this embodiment, when the decision unit 200, for example, is a core logic set 220, the aforementioned Step (201) to Step (205) further include steps as follows.

In Step (501), when the core logic set 220 determines that the computer device 101 has not been operated for a predetermined period of time, or the battery power of the computer device 101 has reached lower threshold of electric power for operation, the core logic set 220 therefore decides that the computer device 101 is required to or must enter a sleep mode. In Step (502), the core logic set 220 switches the sleep pin 221 to an enable status. In Step (503), when the embedded controller 400 detects that the sleep pin 221 of the core logic set 220 is situated in the enable status, the embedded controller 400 starts to determine whether the NFC transceiving module 500 is performing information communication by detecting whether the pin level(s) of the NFC transceiving module 500 is high or low. If the NFC transceiving module 500 is performing information communication, the routine goes to Step (504), otherwise, the routine goes to Step (505). In Step (504), the embedded controller 400 requests the core logic set 220 to switch the working status of the sleep pin 221 to a disable status from the enable status. In Step (505), the embedded controller 400 shuts down the electric power of at least the display module 300 in accordance with the enable status of the sleep pin 221.

In one further specific embodiment, if the sleep mode is a deep sleep mode, the embedded controller 400 in Step (505) shuts down the electric power for all elements of the computer device 101 except the logic chipset and the embedded controller 400.

In another specific embodiment, if the sleep mode is a shutdown mode, the embedded controller 400 in Step (505) shuts down the electric power for all elements of the computer device 101 except the embedded controller 400 in accordance with an enable status of the shutdown pin 222. It is noted that in the shutdown mode, except for providing electric power to the embedded controller 400, the electric power for the remaining elements of the computer device 101 is shut down.

In yet another specific embodiment, the embedded controller 400 and the NFC transceiving module 500 can be integrally installed on a single chip structure or the embedded controller 400 and the NFC transceiving module 500 can share the same components. In this case, the single chip structure is configured with a plurality of pins in which some of the pins are provided for serving the embedded controller 400 and some of the pins are provided for serving the NFC transceiving module 500. Therefore, decreased component cost, a lowering of occupied area and easy integration can be achieved.

In the case where the embedded controller 400 and the NFC transceiving module 500 are integrally installed on a single chip structure, since a register or internal memory (e.g., 8 KB ROM or 100 KB RAM), that built into the embedded controller 400, could for serving the NFC transceiving module 500, the NFC transceiving module 500 can perform information communication with the external NFC unit 700 even though the computer device 101 is situated in the sleep mode or the shutdown mode.

In the case where the embedded controller 400 and the NFC transceiving module 500 are integrally installed on a single chip structure, since the embedded controller 400 is always in an enable status, that is, the embedded controller 400 is always supplied with electric power, the NFC transceiving module 500 will not lose its supplied electric power when entering into any kind of power saving mode, thereby preventing information loss as a result of the cut off of electricity when information has not been fully transmitted. Furthermore, when the external NFC unit 700 is placed in physical proximity to the antenna 621 of the NFC transceiving module 500 for wirelessly and electrically triggering communicating with the NFC transceiving module 500, the computer device 101 can be woken up from the sleep mode and placed in a working mode, or from the shutdown mode to initiate a boot procedure of the computer device 101, so as to enhance safety and convenience associated with the internal information of the computer device 101.

Finally, when the antenna 621 of the NFC transceiving module 500 is installed in the computer device 101 in a manner adjacently disposed under a touch-controlled board electrically connected to the embedded controller 400, the so-called "single chip structure (i.e. implementing the NFC transceiving module 500 in the embedded controller 400)" adopted in the embodiment can simplify the arrangement of circuit wires, so as to lower the difficulty with respect the layout of circuits and components placement.

Although the present disclosure has been described with reference to the preferred embodiments thereof, it is apparent to those skilled in the art that a variety of modifications and changes may be made without departing from the scope of the present disclosure which is intended to be defined by the appended claims.

The readers attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A method of power management of a computer device in which the computer device comprises an embedded controller, a near field communication (NFC) transceiving module, a display module and a decision unit therein, and the decision unit is an image processing unit, the method comprising:

(A) when the image processing unit determines that the computer device is required to enter a power saving mode right now, the image processing unit generates a power-saving-mode signal for enabling the computer device to enter the power saving mode, wherein the embedded controller respectively switches a backlight module power pin and a display panel power pin of the image processing unit into a disable status from the enable status, (B) when the embedded controller detects the power-saving-mode signal, the embedded controller determines whether the NFC transceiving module is performing information communication;

(C) when the embedded controller determines that the NFC transceiving module is performing information communication, the embedded controller requests a core logic set of the computer device to switch the backlight module power pin and the display panel power pin of the image processing unit back to an enable status from the disable status for postponing entrance into the power saving mode until the NFC transceiving module finishes performing the information communication; and (D) when the embedded controller determines that the NFC transceiving module is not performing information communication, the embedded controller shuts down electric power of the display module based on the power-saving-mode signal.

2. A computer device comprising:

a decision unit for determining whether the computer device is required to enter a power saving mode right now, and the decision unit is an image processing unit comprising:

a backlight module power pin comprising an enable status and a disable status; and a display panel power pin comprising an enable status and a disable status;

a near field communication (NFC) transceiving module for performing information communication with an external NFC unit;

a display module comprising a backlight module and a display panel; and an embedded controller electrically connected to the image processing unit, the NFC transceiving module and the display module, wherein, when the image processing unit determines that the computer device is required to enter a power saving mode right now, the image processing unit generates a power-saving-mode signal for enabling the computer device to enter the power saving mode, wherein each of the backlight module power pin and the display panel power pin is switched to the disable status from the enable status, when the embedded controller detects the power-saving-mode signal, the embedded controller determines whether the NFC transceiving module is performing information communication, when the embedded controller determines that the NFC transceiving module is performing information communication, the embedded controller when the embedded controller determines that the NFC transceiving module is performing information communication, the embedded controller requests each of the backlight module power pin and the display panel power pin to be switched back to the enable status from the disable status for postponing entrance into the power saving mode until the NFC transceiving module finishes performing the information communication, when the embedded controller determines that the NFC transceiving module is not performing information communication, the embedded controller shuts down the electric power of the backlight module and the display panel in accordance with the disable status of the backlight module power pin and the display panel power pin.

3. A computer device comprising:

a decision unit for determining whether the computer device is required to enter a power saving mode right now, and the decision unit is a core logic set, and the core logic set comprising a sleep pin comprising an enable status and a disable status;

a near field communication (NFC) transceiving module for performing information communication with an external NFC unit;

a display module comprising a backlight module and a display panel; and an embedded controller electrically connected to the core logic set, the NFC transceiving module and the display module, wherein, when the core logic set unit determines that the computer device is required to enter a power saving mode right now, the core logic set generates a power-saving-mode signal for enabling the computer device to enter the power saving mode, wherein the sleep pin is switched to the enable status from the disable status, when the embedded controller detects the power-saving-mode signal, the embedded controller determines whether the NFC transceiving module is performing information communication, when the embedded controller determines that the NFC transceiving module is performing information communication, the embedded controller requests the sleep pin to be switched back to the disable status from the enable status for postponing entering into the power saving mode until the NFC transceiving module finishes performing information communication, when the embedded controller determines that the NFC transceiving module is not performing information communication, the embedded controller shuts down the electric power of the display module in accordance with the enable status of the sleep pin.

4. The computer device of claim 3, wherein the embedded controller and the NFC transceiving module are integrally installed on a single chip structure.

5. The computer device of claim 4 further comprising a touch-controlled board that is adjacently disposed an antenna of the NFC transceiving module.

* * * * *